(12) United States Patent
Suzuki et al.

(10) Patent No.: US 8,917,478 B2
(45) Date of Patent: Dec. 23, 2014

(54) BEARING WITH GREASE POCKETS, BEARING DEVICE WITH PLURAL BEARINGS, AND RECORDING DEVICE EQUIPPED WITH BEARING DEVICE

(71) Applicant: Seiko Instruments Inc., Chiba (JP)

(72) Inventors: Kenji Suzuki, Chiba (JP); Tsuyoshi Kashiwada, Pathumthani (TH); Robert Gordon Smith, Pathumthani (TH); Virat Sornsiri, Pathumthani (TH)

(73) Assignee: Seiko Instruments Inc. (JP)

( * ) Notice: Subject to any disclaimer, the term of this patent is extended or adjusted under 35 U.S.C. 154(b) by 0 days.

(21) Appl. No.: 14/041,052

(22) Filed: Sep. 30, 2013

(65) Prior Publication Data

US 2014/0126085 A1    May 8, 2014

(30) Foreign Application Priority Data

Nov. 7, 2012  (JP) .................................. 2012-245673

(51) Int. Cl.
| | | |
|---|---|---|
| G11B 17/04 | (2006.01) | |
| G11B 19/20 | (2006.01) | |
| C10M 105/00 | (2006.01) | |
| F16C 33/41 | (2006.01) | |
| F16C 33/66 | (2006.01) | |
| C10M 169/04 | (2006.01) | |
| F16C 19/54 | (2006.01) | |

(52) U.S. Cl.
CPC ............. *G11B 19/2036* (2013.01); *F16C 19/54* (2013.01); *C10M 105/00* (2013.01); *F16C 33/416* (2013.01); *F16C 33/6614* (2013.01); *C10M 169/04* (2013.01); *F16C 2370/12* (2013.01); *F16C 33/6633* (2013.01)
USPC ...................................................... 360/98.07

(58) Field of Classification Search
CPC .................................................. G11B 19/2009
USPC ................................ 360/98.07, 99.04, 99.08
See application file for complete search history.

(56) References Cited

U.S. PATENT DOCUMENTS

| | | | | |
|---|---|---|---|---|
| 4,996,613 | A  * | 2/1991 | Hishida ...................... | 360/99.08 |
| 5,498,357 | A  * | 3/1996 | Naka et al. ..................... | 508/176 |
| 5,559,650 | A  * | 9/1996 | Repphun et al. ........... | 360/99.16 |
| 2009/0207527 | A1 * | 8/2009 | Takei et al. .................. | 360/244 |
| 2012/0050916 | A1 * | 3/2012 | Khan ............................ | 360/224 |

OTHER PUBLICATIONS

Patent Abstracts of Japan, Publication No. 2003-239954, Publication Date Aug. 27, 2003.

* cited by examiner

*Primary Examiner* — Joseph Feild
*Assistant Examiner* — Gustavo Polo
(74) *Attorney, Agent, or Firm* — Adams & Wilks

(57) ABSTRACT

A bearing device has two or more bearings each having an inner ring and an outer ring disposed on the same axis. A ring-shaped holder is disposed between the inner ring and the outer ring and has circumferentially spaced-apart rolling element pockets with a concave grease pocket between each two adjacent rolling element pockets. Rolling elements are disposed in a rollable manner in respective ones of the rolling element pockets and a grease is stored in the grease pockets, the grease serving as a lubricant of the rolling element. The grease consists of at least a base oil comprised of aromatic carbon and a thickener, the content of the aromatic hydrocarbon being 70 weight % or more of the grease.

11 Claims, 9 Drawing Sheets

`US 8,917,478 B2`

BEARING WITH GREASE POCKETS, BEARING DEVICE WITH PLURAL BEARINGS, AND RECORDING DEVICE EQUIPPED WITH BEARING DEVICE

BACKGROUND OF THE INVENTION

1. Field of the Invention

The present invention relates to a bearing, a bearing device, and a recording device that are used in a hard disk.

2. Background Art

The hard disk reads and writes magnetic recording data by causing a magnetic head to float and perform a swinging movement across a rotating magnetic disk. An arm having the magnetic head is rotated and supported by a bearing device. With improvement of recording density of the hard disk and improvement of reading and writing speeds of the data, high durability is required in the bearing device that supports the magnetic head. For that reason, in the bearing device for the hard disk, in order to secure durability, grease using a base oil in which a mineral oil is mixed with poly-α-olefin is used (see JP-A-2003-239954).

In general, a floating quantity of the magnetic head is reduced with an improvement of the recording density of the hard disk. When the floating quantity of the magnetic head is reduced, the attachment of foreign matter to the magnetic head leads to reading and writing errors. The foreign matter, not only solid matter, but also oil droplets or the like, causes problems in reading and writing the data.

The grease of JP-A-2003-239954 generates an outgas of a large quantity of aliphatic hydrocarbon based on a composition of the base oil. The outgas of aliphatic hydrocarbon has a problem in that the outgas is condensed on the magnetic disk of the hard disk, is attached as oil droplets, and causes the reading and writing errors of the data. Thus, there are great problems in an improvement of the recording density of the hard disk and an improvement of the reading and writing speeds of the data. Furthermore, in the grease, a phenomenon also occurs where the base oil as well as the outgas becomes oil droplets and is scattered. This is also similarly attached to the magnetic disk in an oil droplet shape and causes the same problem.

The present invention has been made out of consideration of the situations mentioned above, and an object thereof is to provide a bearing, a bearing device, and a recording device that can reduce the reading and writing errors of the data even if foreign matter is attached to the magnetic disk.

SUMMARY OF THE INVENTION

The present invention provides means as below in order to solve the problems mentioned above.

According to an aspect of the present invention, there is provided a bearing device that is used in a hard disk having a magnetic disk having a lubrication film on a surface thereof, wherein the bearing device has two or more bearings, the respective bearings are constituted by an inner ring and an outer ring placed on the same axis, a plurality of rolling elements that are built in a ring-shaped region between the inner ring and the outer ring with a gap in a circumferential direction, a plurality of rolling element pockets that hold the rolling elements in a rollable manner in a state of being placed at regular intervals, and a holder having a grease pocket of a concave shape that is placed between the rolling element pockets and stores grease serving as a lubricant of the rolling elements, the inner ring and the outer ring, two or more bearings are placed on the same axis, the bearing device is formed from a shaft fastened with the respective inner rings, the grease consists of at least a base oil and a thickener, aromatic hydrocarbon is used for the base oil, and a content of the aromatic hydrocarbon used in the base oil is 70 weight % or more of the grease.

According to the aspect of the present invention, since the base oil as a main ingredient of the grease consists of mainly aromatic hydrocarbon, and the content of aromatic hydrocarbon of the base oil of the grease is 70 weight % or more, when the grease ingredients become an outgas, are attached to the magnetic disk and are condensed, or when the grease ingredients are scattered as oil droplets and are attached to the magnetic disk surface, the grease ingredients rarely become an oil droplet state. Thus, it is possible to suppress an occurrence of the reading and writing errors of the magnetic data due to the bearing device.

According to another aspect of the present invention, there is provided a bearing device that is used in a hard disk having a magnetic disk having a lubrication film on a surface thereof, wherein the bearing device has two or more bearings, the respective bearings are constituted by an inner ring and an outer ring placed on the same axis, a plurality of rolling elements that are built in a ring-shaped region between the inner ring and the outer ring with a gap in a circumferential direction, a plurality of rolling element pockets that hold the rolling elements in a rollable manner in a state of being placed at regular intervals, and a holder having a grease pocket of a concave shape that is placed between the rolling element pockets and stores grease serving as a lubricant of the rolling elements, the inner ring and the outer ring, two or more bearings are placed on the same axis, the bearing device is formed from a shaft fastened with the respective inner rings, the grease consists of at least a base oil and a thickener, aromatic hydrocarbon is used for the base oil, and a content of the aromatic hydrocarbon used in the base oil is 80 weight % or more of the grease.

According to the aspect of the present invention, since 80% or more of the content of the grease is aromatic hydrocarbon, when the outgas discharged from the grease is attached to the magnetic disk and is condensed, or when the outgas is scattered from the grease as oil droplets and is attached to the magnetic disk surface, the outgas rarely becomes an oil droplet state. Thus, it is possible to extremely lower an occurrence of the reading and writing errors of the magnetic data due to the bearing device.

According to still another aspect of the present invention, there is provided a bearing device that is used in a hard disk having a magnetic disk having a lubrication film on a surface thereof, wherein the bearing device has two or more bearings, the respective bearings are constituted by an inner ring and an outer ring placed on the same axis, a plurality of rolling elements that are built in a ring-shaped region between the inner ring and the outer ring with a gap in a circumferential direction, a plurality of rolling element pockets that hold the rolling elements in a rollable manner in a state of being placed at regular intervals, and a holder having a grease pocket of a concave shape that is placed between the rolling element pockets and stores grease serving as a lubricant of the rolling elements, the inner ring and the outer ring, two or more bearings are placed on the same axis, the bearing device is formed from a shaft fastened with the respective inner rings, the grease consists of at least a base oil and a thickener, aromatic hydrocarbon is used for the base oil, and a content of the aromatic hydrocarbon used in the base oil is 95 weight % or less of the grease.

According to the aspect of the present invention, since 70 weight % or more and 95 weight % or less of the content of the grease is the aromatic hydrocarbon, when the outgas discharged from the grease is attached to the magnetic disk and is condensed, or when the outgas is scattered from the grease as oil droplets and is attached to the magnetic disk surface, the outgas rarely becomes an oil droplet state. Thus, it is possible to extremely lower an occurrence of the reading and writing errors of the magnetic data due to the bearing device.

In addition, in the bearing device of the present invention, the base oil may consist of only aromatic hydrocarbon.

According to the aspect of the present invention, since the base oil of the grease is the aromatic hydrocarbon, it is possible to extremely lower the frequency of occurrence of the reading and writing errors of the magnetic data.

Furthermore, in the bearing device of the present invention, the aromatic hydrocarbon used for the base oil may be alkylnaphthalene.

According to an aspect of the present invention, since alkylnaphthalene is used for the base oil, an amount of evaporation of the base oil can be reduced, and thus, satisfactory reliability can be obtained in addition to the effects of the aspects of the present invention mentioned above.

Furthermore, in addition, according to still another aspect of the present invention, the thickener may be one of a lithium soap or a lithium complex soap.

According to the aspect of the present invention, it is possible to suppress the reading and writing errors of the used hard disk to be a low rate, thermal resistance and oxidation resistance stability are excellent, and the life of the bearing device can also be lengthened.

Furthermore, according to still another aspect of the present invention, at least one of an antioxidant, an extreme pressure agent, and an oiliness agent is added to the grease, and the total of the additive is 10 weight % or less as the content of the grease.

According to the aspect of the present invention, since it is possible to provide a bearing device of a long life due to the effects of the oxidation suppression of the grease, and the abrasion suppression of the inner ring, the outer ring and the rolling elements, and the content of the total is 10 weight % or less of the grease, an amount of outgas discharged from the additive separately from the base oil is reduced, and thus, it is possible to further suppress the occurrence rate of the reading and writing errors of the magnetic data.

According to the bearing device related to the present invention, an effect is exhibited that the reading and writing errors of the magnetic data of the hard disk can be suppressed.

DETAILED DESCRIPTION OF THE INVENTION

Hereinafter, an embodiment related to the present invention will be described with reference to FIGS. 1 to 8.

Figure 1:
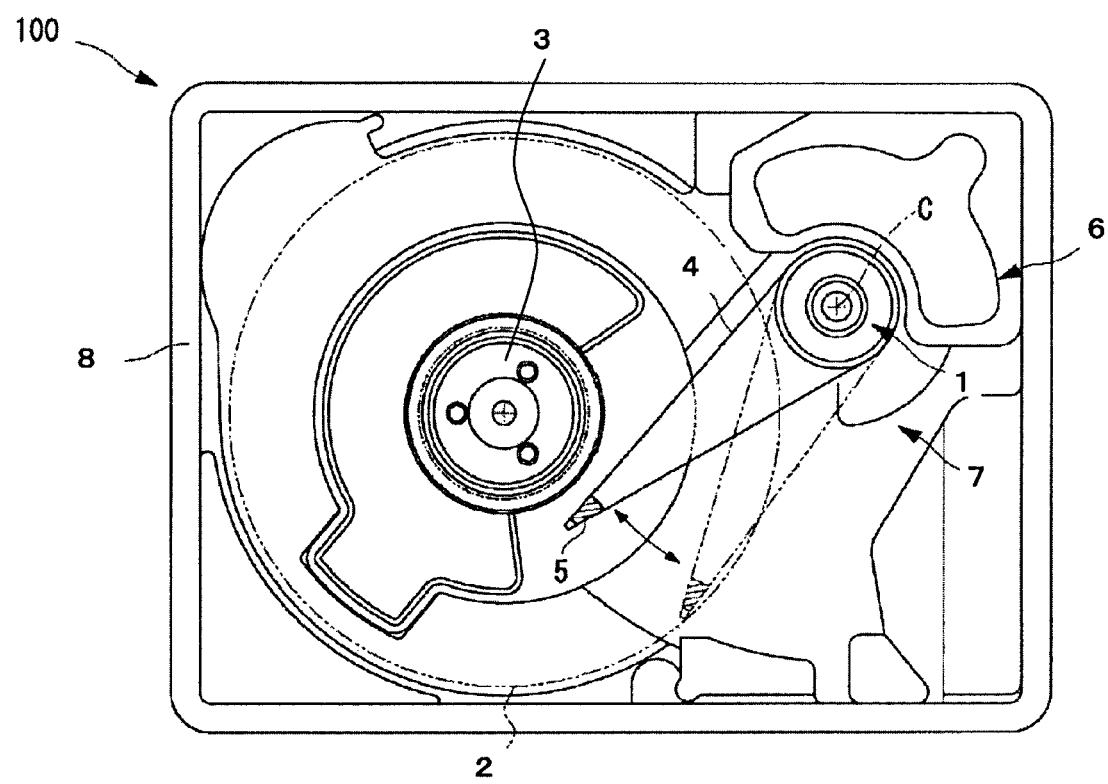
FIG. 1 is a perspective view of a hard disk that uses a bearing device that is an embodiment of the present invention.

FIG. 1 is a perspective view of a hard disk 100 using a bearing device 1 that is an embodiment of the present invention.

In the hard disk 100, a motor 3 is fixed onto a base plate 8. A magnetic disk 2 is mounted on the motor 3 and is rotated. A magnetic head 5 is fixed to a leading end of an arm 4, and the arm 4 is bonded and fixed to the bearing device 1 and is rotated and supported by the bearing device 1. Furthermore, a coil 6 is provided in an end of the arm 4 opposite to the magnetic head 5, and a permanent magnet 7 is installed on the base plate 8 of a position of the arm 4 opposite to the coil 6 in a thickness direction. Electric current of alternating current flows through the coil 6, whereby the coil 6 is attracted and repelled with the permanent magnet 7 placed at the opposite position, and thus, the arm 4 swings around a central axis C of the bearing device 1. The magnetic head 5 swings across the rotating magnetic disk 2 by the swinging of the arm 4, and the data is written on the magnetic disk or the magnetic data of the magnetic disk is read.

Figure 2:
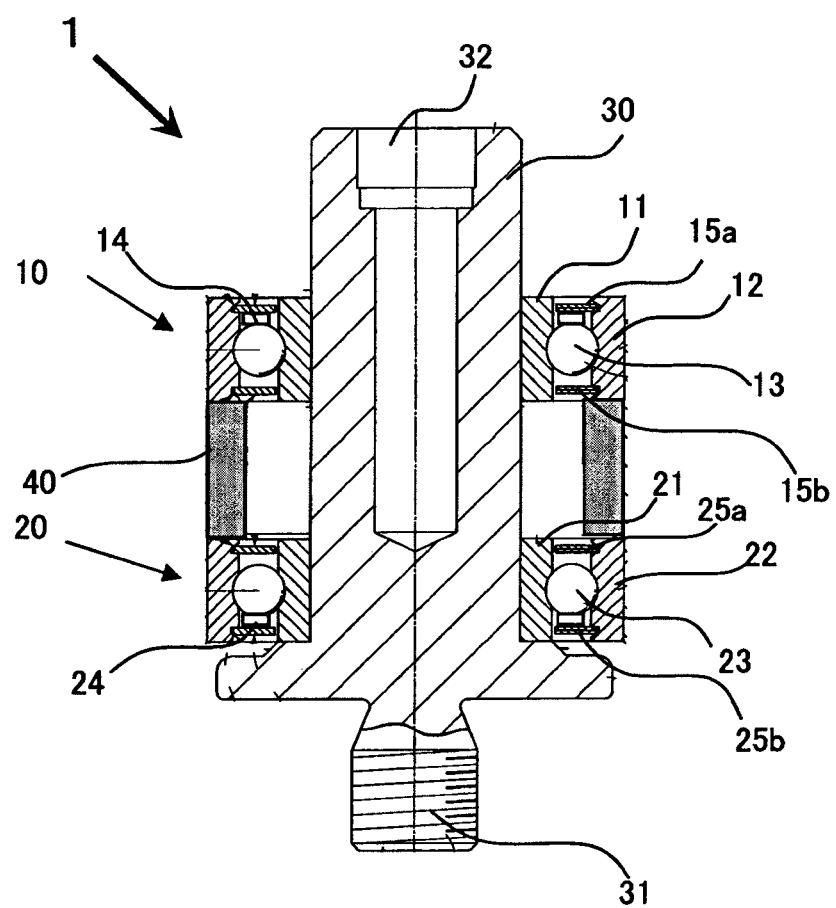
FIG. 2 is a longitudinal cross-sectional view of an embodiment of the bearing device of the present invention.

FIG. 2 is a longitudinal cross-sectional view of the bearing device 1 that is an embodiment of the present invention.

The bearing device 1 is constituted by a first bearing 10, a second bearing 20 and a spacer 40 that are placed on the same axis as a shaft 30 that is a rotation axis of the bearing device.

The first bearing 10 is configured so that thirteen rolling elements 13 are placed between an inner ring 11 and an outer ring 12, and shield plates 15a and 15b are fitted in an upper end and a lower end of the outer ring. The thirteen rolling elements 13 are placed in a space between the inner ring 11 and the outer ring 12 using a holder 14 in a ring shape at equal intervals.

The second bearing 20 is configured so that thirteen rolling elements 23 are placed between an inner ring 21 and an outer ring 22, and shield plates 25a and 25b are fitted to an upper end and a lower end of the outer ring. The thirteen rolling elements 23 are placed in a space between the inner ring 21 and the outer ring 22 using a holder 24 in a ring shape at equal intervals.

The inner ring 11 of the first bearing 10 and the inner ring 21 of the second bearing 20 are fixed to the shaft 30 with an adhesive. Furthermore, the spacer 40 is located between the outer ring 12 of the first bearing 10 and the outer ring 22 of the second bearing 20 and is interposed by both.

Furthermore, when fixing the inner ring 11 and the inner ring 21 to the shaft 30 with an adhesive, the inner ring 11 is fixed with an adhesive while applying predetermined load in a lower direction in the drawings, and thus the bearing device 1 of the present invention is configured in a state where predetermined preload is applied to both of the first bearing 10 and the second bearing 20. For that reason, the bearing device 1 slides on the respective inner ring, the outer ring and the rolling elements of two bearings 10 and 20 without play.

Furthermore, a screw portion 31 is provided at a lower end of the shaft 30 and is fixed to the base plate 8 of the hard disk 100. Furthermore, a screw portion 32 is provided at an upper end of the shaft, and although not illustrated in the drawings, a top cover of the hard disk 100 is fixed and supported by the screw portion 32. Furthermore, the arm 4 on which the magnetic head 5 of the hard disk 100 is mounted has a through hole, and the outer ring 12 of the first bearing 10 and the outer ring 22 of the second bearing 20 of the bearing device 1 is fixed to the through hole.

Figure 3:
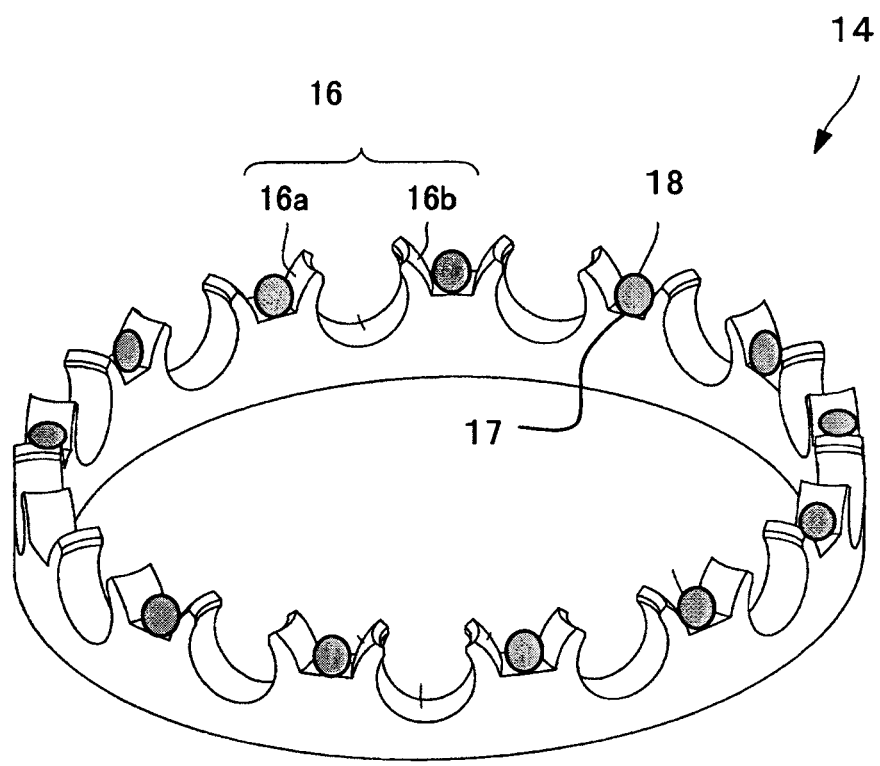
FIG. 3 is a perspective view of a holder that is used in the bearing device of FIG. 2.

FIG. 3 is a perspective view of a holder that is used in the bearing device 1 of FIG. 2.

In the first bearing 10 of the bearing device 1 of the present invention, a holder 14 is used which is manufactured by resin so as to place the thirteen rolling elements 13 between the inner ring 11 and the outer ring 12 at equal intervals. In addition, since a holder 24 of the second bearing 20 is the same as the holder 14 in a structure, a material and a function, the structure of the holder 14 will be described.

The holder 14 manufactured by resin has an annular ring shape, and on a circumference thereof, thirteen rolling element pockets 16 for holding the positions of the thirteen rolling elements 13 subjected to the rolling movement in a space between the inner ring 11 and the outer ring 12 at equal intervals are provided. The rolling element pockets 16 are designed so as to surround the rolling elements 13 with a predetermined gap so that the rolling elements 13 can be rotatably supported by two curved portions or claws 16a and 16b. As illustrated in FIG. 3, the two curved portions 16a and 16b of each rolling element pocket 16 curve toward and face one another, and the opposedly facing inner faces of the two curved portions are in rolling contact with one of the rolling elements 13 (FIG. 1). The outer faces of adjacent curved portions 16a and 16b of each two adjacent rolling element pockets 16 form one of the grease pockets 17.

Furthermore, grease pockets 17 of a concave state are each formed between the rolling element pockets 16 adjacent to each other, and a grease 18 is stored in the grease pockets 17. Oil contents begin to flow from the grease 18 stored in the grease pockets 17, oil films are generated on a sliding surface between the inner ring 11 and the rolling elements 13, and a sliding surface between the outer ring 12 and the rolling elements 13, and thus a lubrication effect is exhibited.

The grease 18 consists of a base oil and a thickener, alkylnaphthalene (aromatic hydrocarbon) is contained in the base oil, and a lithium soap is used as the thickener. In addition, in the present embodiment, although the lithium soap is used as the thickener, a lithium complex soap may be used, and in this case, thermal resistance can be further improved.

Furthermore, the grease 18 is added with an antioxidant and an extreme pressure agent as additives, thiophosphoric acid zinc is used as the antioxidant, and organomolybdenum is used as the extreme pressure agent. In the present embodiment, although thiophosphoric acid zinc is used in the antioxidant, amines, phenols or the like may be used depending on applications. In the present embodiment, although organomolybdenum is used in the extreme pressure agent, organosulfur compound or the like may be used.

In addition, the content of alkylnaphthalene serving as the base oil of the grease 18 is 95 weight %.

Figure 4:
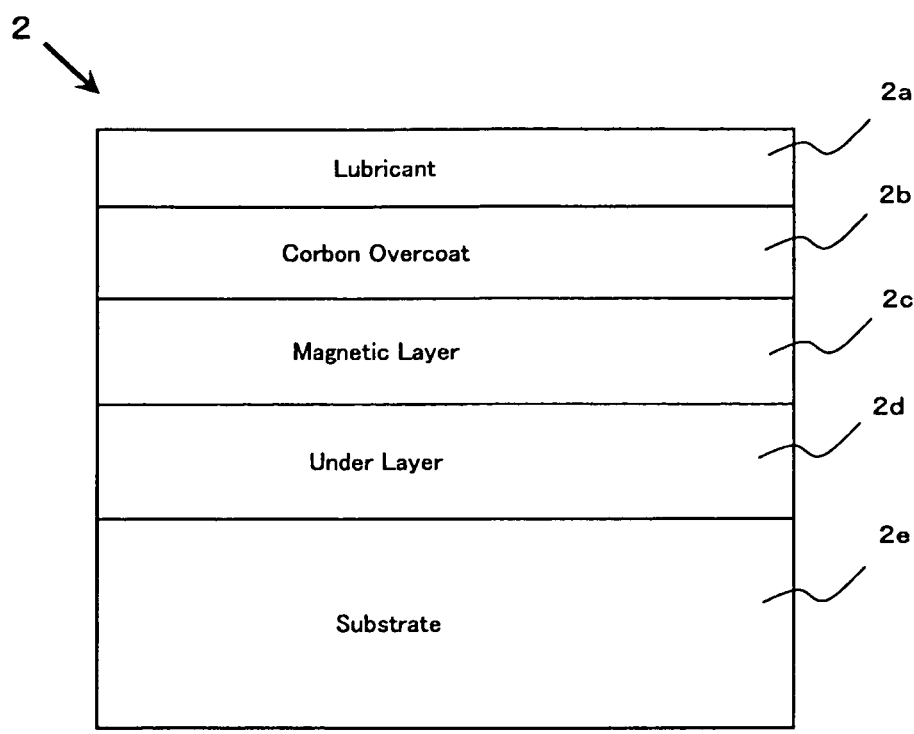
FIG. 4 is a longitudinal cross-sectional view of a magnetic disk that is used in the hard disk of FIG. 1.

FIG. 4 is a longitudinal cross-sectional view of the magnetic disk 2 that is used in the hard disk 100 of FIG. 1. The magnetic disk 2 consists of a base 2e, a ground layer 2d, a magnetic layer 2c, a protective layer 2b and a lubrication film 2a of the uppermost layer. A gap between the magnetic head 5 and the magnetic disk 2 when driving the hard disk is very small, for example, approximately 10 nm. The lubrication film 2a is provided to relax the contact between the magnetic disk 2 and the magnetic head 5 and protect the magnetic disk from sliding and the abrasion. In general, in the lubrication film 2a, a PFPE compound such as fluorine-based fomblin oil. In the hard disk 100 of FIG. 1, the PFPE compound is also used.

Figure 5:
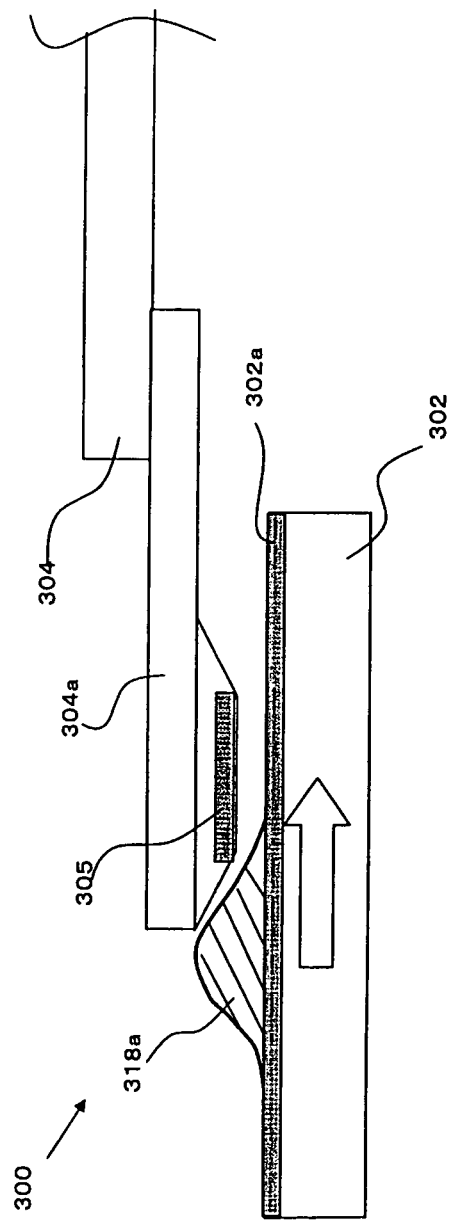
FIG. 5 is a schematic view for describing problems of the related art.

FIG. 5 is a diagram of the related art that schematically illustrates problems to be solved by the present invention.

In the hard disk 300, a head 305 is mounted on an arm 304 via a suspension 304a, and the arm 304 is rotated and supported by a bearing device of the related art. In addition, when the hard disk 300 is in a driven state, a gap between the magnetic head 305 and the magnetic disk 302 is very small of approximately 10 nm. In addition, in the present embodiment, although the arm member consists of the suspension 304a and the arm 304, the arm member is not of course limited thereto.

Grease 318 of the bearing of the bearing device of the related art consists of a base oil and a thickener, and a mixed oil of a mineral oil and poly-α-olefin is used for the base oil. However, the outgas discharged from the grease 318 is attached to the surface of the magnetic disk 302. Furthermore, the oil droplets are scattered from the grease 318 and are attached to the surface of the magnetic disk 302. Since aliphatic hydrocarbon is contained in large quantities based on, particularly, the composition of the base oil of the grease 318, the oil ingredient 318a attached to the magnetic disk 302 is incompatible to the lubrication film 302a of the PFPE compound. Thus, the oil ingredient 318a is attached to the surface of the magnetic disk 202 in an oil droplet state. Since the oil ingredient 318a attached to the surface of the magnetic disk 302 is in the oil droplet state, there is a problem in that the oil ingredient 318a comes into contact with the magnetic head 305, and causes the reading and writing errors of the magnetic data.

Figure 6:
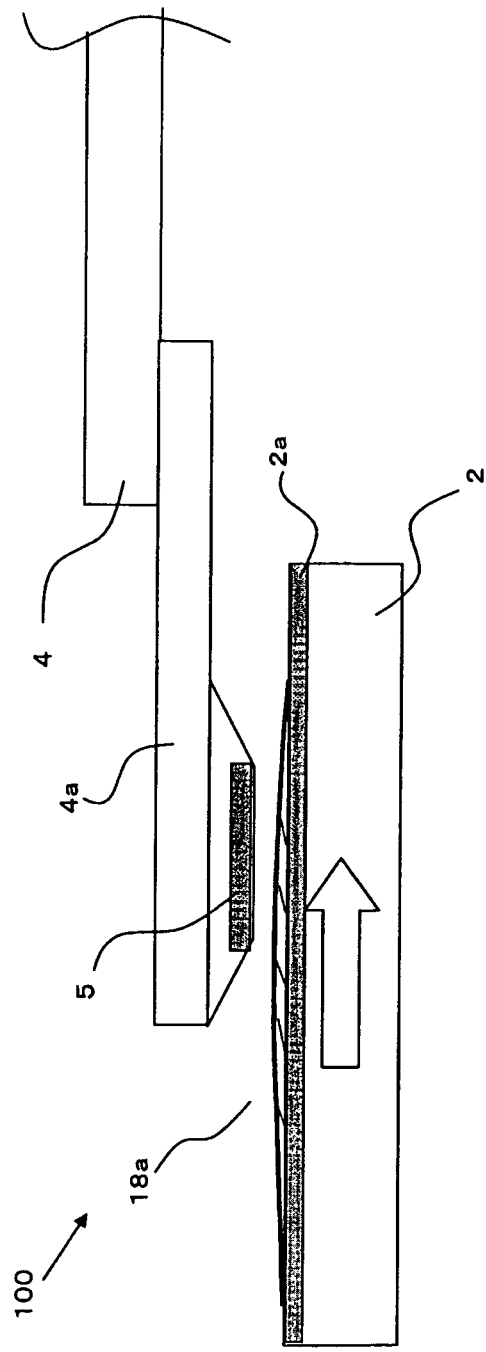
FIG. 6 is a schematic view for describing effects of the present invention.

FIG. 6 is a diagram that schematically illustrates the effect of the present invention. In the hard disk 100 of the embodiment of the present invention, the head 5 is mounted on the arm 4 via the suspension 4a, and the arm 4 is rotated and supported by the bearing device 1. In addition, when the hard disk 100 is in the driven state, the gap between the magnetic head 5 and the magnetic disk 2 is very small of approximately 10 nm.

The bearing grease 18 of the bearing device consists of the base oil and the thickener, alkylnaphthalene is used for the base oil, and a lithium soap is used for the thickener. The outgas discharged from the grease 18 is attached to the surface of the magnetic disk 2. Furthermore, the oil droplets are scatted from the grease 18 and are attached to the surface of the magnetic disk 2. Since the oil ingredients 18a attached to the magnetic disk 2 mainly contain aromatic hydrocarbon, particularly based on the composition of the base oil of the grease 18. Thus, even if the oil ingredients 18a are attached to the magnetic disk 2 mentioned above, since the lubrication film 2a of the surface of the magnetic disk 2 is the PFPE compound, compatability is very good. The oil ingredients 18a are attached, not as an oil droplet, but as a film shape when being attached to the surface of the magnetic disk 202. Since the oil ingredients 18a attached to the surface of the magnetic disk 2 is a film shape, an excessive contact with the magnetic head 5 can be avoided. Thus, it is possible to obtain a significant effect that the reading and writing errors of the magnetic data rarely occur, unlike the related art. In addition, in the grease 18, the content of alkylnaphthalene that is the base oil is 95 weight % of the grease 18.

Figure 7:
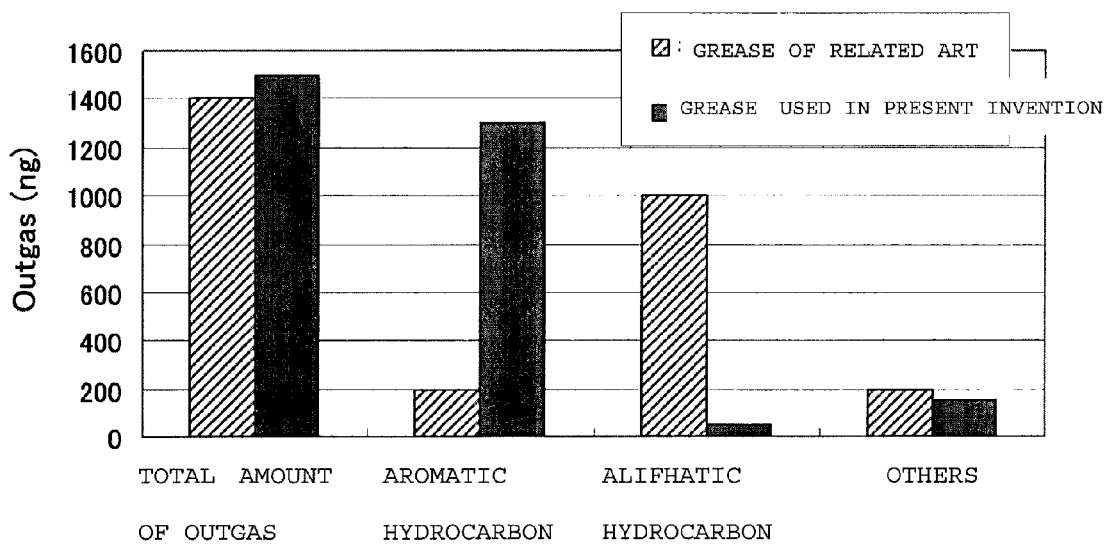
FIG. 7 is a measurement result of an amount of outgas of grease used in FIG. 1 and grease of the related art.

FIG. 7 is a graph in which outgas amounts of the grease 18 used in the bearing device 1 of the present invention and a grease 318 used in a bearing device of the related art are measured using a gas chromatography. In addition, an amount of the grease used in the measurement is measured by an amount that is used in one bearing device 1. Furthermore, the result indicates an average value when performing the measurement ten times while changing the measurement sample.

Compared to the grease 318 that is used in the bearing device of the related art, in the grease 18 of the bearing device 1 of the embodiment of the present invention, it is understood that there is much amount of the outgas of aromatic hydrocarbon, but there is very little amount of the outgas of aliphatic hydrocarbon. Thereby, most of the oil ingredients 18a attached to the magnetic disk 2 consists of aromatic hydrocarbon. Since compatability between the oil ingredients 18a and the lubrication film 2a is good, the oil ingredients 18a do not become oil droplets when being attached to the surface of the magnetic disk 202 and are attached as the film shape. Since there is much amount of the content of alkylnaphthalene in the base oil of the grease 18 related to the present embodiment, the outgas of aliphatic hydrocarbon and other gas are discharged, but the most of them is discharged from the additive.

Figure 8:
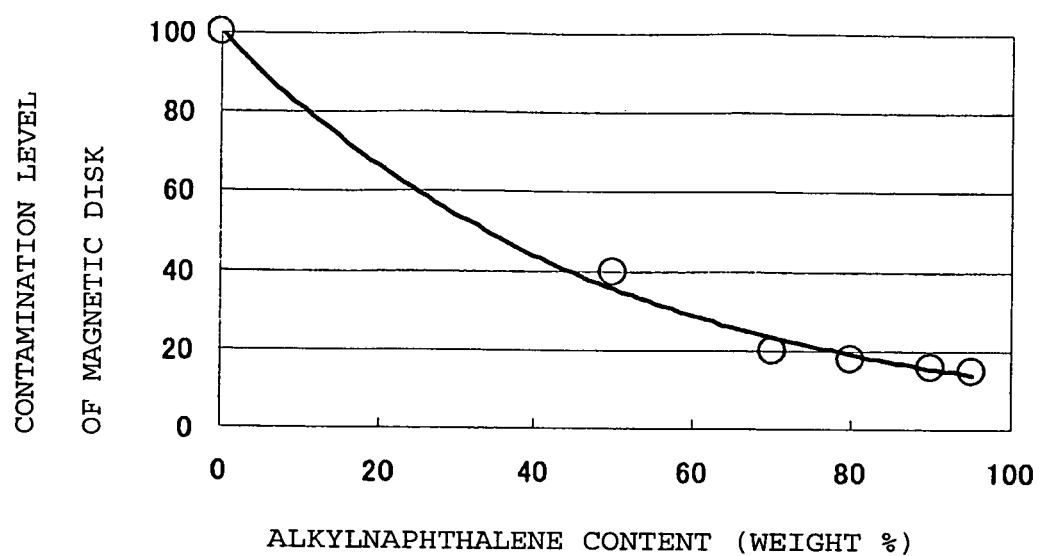
FIG. 8 is a diagram of a test result that illustrates a relationship between a content of alkylnaphthalene for grease and an amount of contaminant of the magnetic disk.

FIG. 8 is a diagram of a test result that illustrates a relationship between the content of alkylnaphthalene serving as the base oil of the grease and a contamination level of the disk.

The test is one that makes grease using the base oil in which the mineral oil and alkylnaphthalene are mixed with each other at a predetermined ratio, each incorporates the bearing device using the grease into the hard disk, and measures the contamination level of the disk after driving the hard disk for a predetermined time.

In addition, a vertical axis indicates the result of each test in a normalized manner when a degree of a dirt condition of the oil attached to the magnetic disk in a case where the base oil contains the mineral oil of 100% but does not contain alkylnaphthalene is set to 100. In addition, herein, although the dirt condition of the oil is a value that is quantitatively calculated from a number and a dimension of a thing in which the oil attached to the magnetic disk seems to be an oil droplet state.

Form the result, when the content of alkylnaphthalene is 70 weight % or more of the grease, it is understood that an amount that the oil attached to the magnetic disk surface becomes an oil droplet is greatly reduced.

When the content of the alkylnaphthalene is 70 weight % or less of the grease, the influence of aliphatic hydrocarbon that is an element of the grease other than alkylnaphthalene increases, and the contamination level of the surface of the magnetic disk 2 increases.

Meanwhile, when the content of the alkylnaphthalene exceeds 95 weight % of the grease, the oil ingredients discharged from the grease do not become oil droplets but become the film shape and are attached to the magnetic disk 202, and thus the contamination level of the surface of the magnetic disk 2 is reduced. However, if the content of alkylnaphthalene exceeds 95 weight % of the grease, the content of the base oil for the grease is increased. As a result, the content of the thickener or the additive is not secured, and the base oil is easily scattered.

As mentioned above, the inventors of the present invention found that the content of aromatic hydrocarbon of the grease and a fluorine-based lubrication film of the magnetic disk 2 are greatly related to the contamination level on the magnetic disk 2 and the retention of the grease in the bearing. In the present embodiment, the content of alkylnaphthalene (aromatic hydrocarbon) is 70 weight % or more and 95 weight % or less of the grease, whereby it is possible to suppress the contamination level of the surface of the magnetic disk 2, and thus it is possible to prevent the degradation of the retention of the grease in the bearing.

Figure 9:
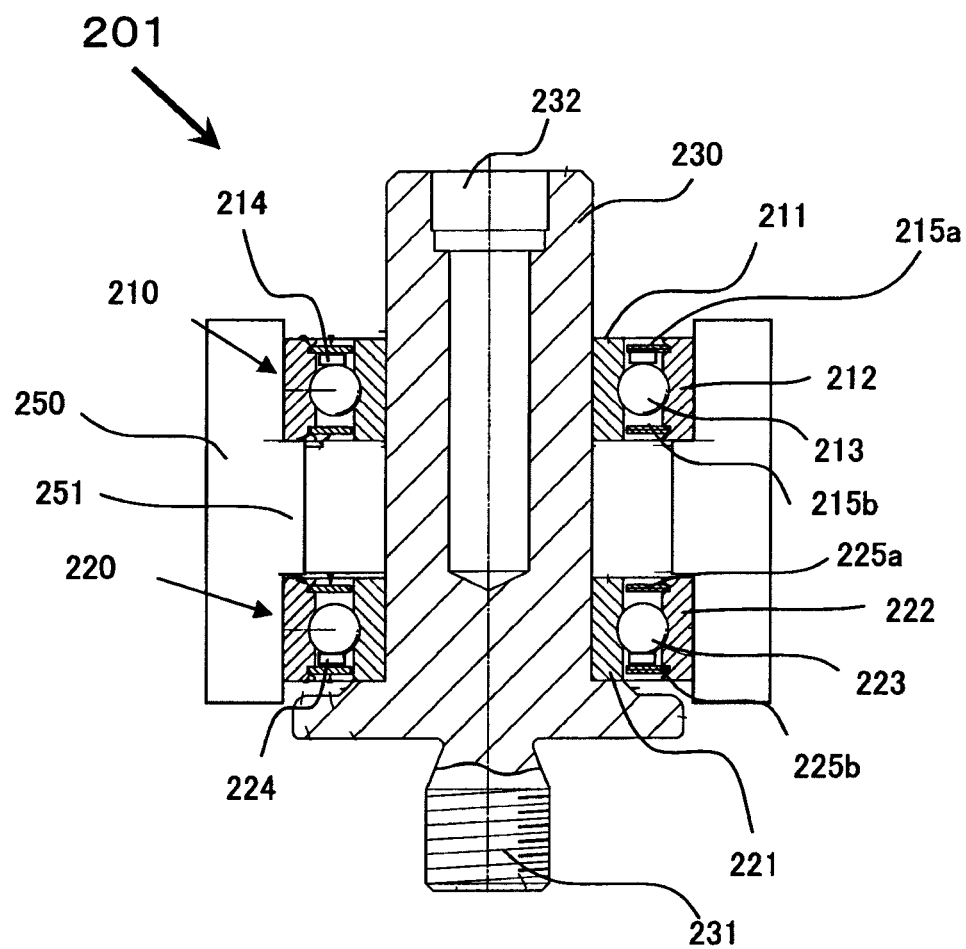
FIG. 9 is a longitudinal cross-sectional view that illustrates an embodiment of a bearing device of the present invention.

FIG. 9 is a longitudinal cross-sectional view that illustrates an embodiment of the bearing device 201 of the present invention.

The bearing device 201 is constituted by a first bearing 210 and a second bearing 220 that are placed on the same axis as a shaft 230 serving as a rotation axis of the bearing device, and a sleeve 250 placed outside the bearings 210 and 220.

The first bearing 210 is configured so that thirteen rolling elements 213 are placed between an inner ring 211 and an outer ring 212, and shield plates 215a and 215b are fitted in an upper end and a lower end of the outer ring. The thirteen rolling elements 213 are placed in a space between the inner ring 211 and the outer ring 212 using a holder 214 in a ring shape at equal intervals.

The second bearing 220 is configured so that thirteen rolling elements 223 are placed between an inner ring 221 and an outer ring 222, and shield plates 225a and 225b are fitted in an upper end and a lower end of the outer ring. The thirteen rolling elements 223 are placed in a space between the inner ring 221 and the outer ring 222 using a holder 224 in a ring shape at equal intervals.

The inner ring 211 of the first bearing 210 and the inner ring 221 of the second bearing 220 are fixed to the shaft 230 with an adhesive. Furthermore, the sleeve 250 is fixed to the outer ring 212 of the first bearing 210 and the outer ring 222 of the second bearing 220 with an adhesive. In addition, a step portion 251 is provided on an inner diameter surface of the cylindrical sleeve 250, and the step portion 251 is configured so as to be fitted to the outer ring 212 and the outer ring 222.

Furthermore, in the bearing device 201 of the present invention, when fixing the bearing 210 and the bearing 220 to the shaft 230 and the sleeve 250 with an adhesive, the inner ring 221 of the bearing 210 is fixed with an adhesive while applying predetermined load in a lower direction in the drawings. Thereby, preload is applied to the two bearings 210 and 220. In addition, the step portion 251 of the sleeve 250 is in the state of being interposed between the two outer rings 212 and 222, and functions as an air end for applying preload to the bearings 210 and 220. Thereby, the respective inner rings, the outer rings and the rolling elements of two bearings 210 and 220 slide without play.

Furthermore, a screw portion 31 is provided at a lower end of the shaft 30 and is fixed to the base plate 8 of the hard disk 100. Furthermore, a screw portion 32 is provided at an upper end of the shaft, and although not illustrated in the drawings, a top cover of the hard disk 100 is fixed and supported by the screw portion 32. Furthermore, the arm 4 on which the magnetic head 5 of the hard disk 100 is mounted has a through hole, and the sleeve 250 of the bearing device 201 is fastened to the through hole.

In addition, the present invention is not limited to the respective embodiments, and the base oil may consist of only the aromatic hydrocarbon (for example, alkylnaphthalene). In addition, the grease includes the additive that consists of at least one of an antioxidant, an extreme pressure agent and an oiliness agent, and the total of the additive is preferably 30 weight % or less of the grease, and is particularly preferably 10 weight % or less of the grease.

What is claimed is:

1. A bearing for use in a hard disk having a magnetic disk having a fluorine-based lubrication film on a surface thereof, the bearing comprising:

an outer ring; an inner ring disposed inside the outer ring and spaced therefrom to define therebetween an annular space; a ring-shaped holder disposed in the annular space, the holder having circumferentially spaced-apart rolling element pockets and a grease pocket between each two adjacent rolling element pockets; rolling elements disposed in a rollable manner in respective ones of the rolling element pockets between the inner and outer rings; and a grease stored in the grease pockets, the grease having a base oil having an aromatic hydrocarbon, and the grease containing 70% or more by weight of the aromatic hydrocarbon.

2. The bearing according to claim 1; wherein the grease contains 80% or more by weight of the aromatic hydrocarbon.

3. The bearing according to claim 2; wherein the grease contains 95% or less by weight of the aromatic hydrocarbon.

4. The bearing according to claim 1; wherein the aromatic hydrocarbon is alkylnaphthalene.

5. The bearing according to claim 1; wherein the base oil consists of only the aromatic hydrocarbon.

6. The bearing according to claim 1; wherein the grease includes a thickener, and the thickener is one of a lithium soap and a lithium complex soap.

7. The bearing according to claim 1; wherein the grease includes an additive that consists of at least one of an antioxidant, an extreme pressure agent and an oiliness agent, and a total of the additive is 10% by weight or less of the grease.

8. A bearing device comprising two or more bearings according to claim 1, the two or more bearings being mounted on a common shaft.

9. A recording device that includes the bearing according to claim 1, comprising:
   an arm member that is supported by the bearing;
   a recording head carried by in the arm member; and
   a motor that rotates the magnetic disk.

10. The bearing according to claim 1, wherein the grease pockets have a concave shape.

11. The bearing according to claim 1, wherein the rolling element pockets each have two curved portions curved toward and facing one another, inner opposed faces of the two curved portions being in rolling contact with one of the rolling elements, and outer faces of adjacent curved portions of two adjacent rolling element pockets forming one of the great pockets.

* * * * *